Figure 1:
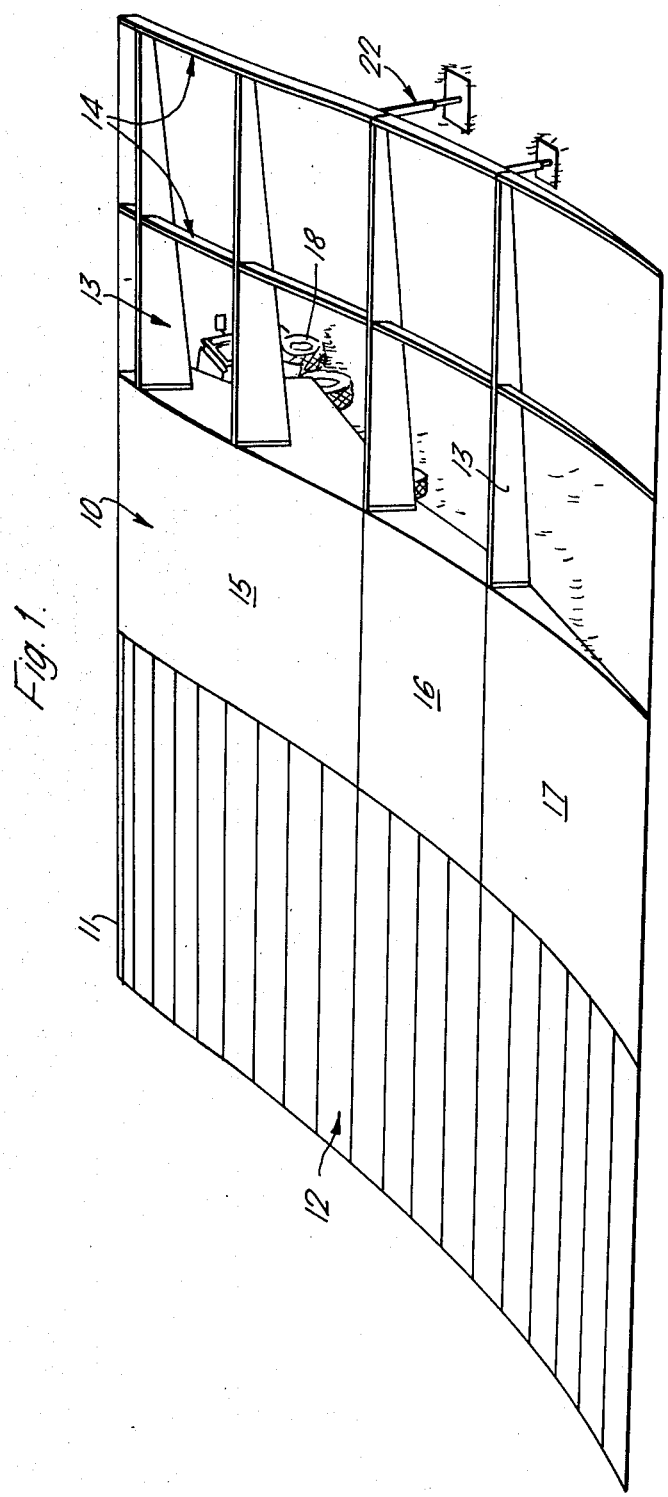

United States Patent [19]

Taylor

[11] 4,267,991
[45] May 19, 1981

[54] PORTABLE RUNWAY

[75] Inventor: Douglas R. Taylor, Margate, England

[73] Assignee: The Secretary of State for Defence in Her Brittanic Majesty's Government of the United Kingdom of Great Britain and Northern Ireland, London, England

[21] Appl. No.: 15,919

[22] Filed: Feb. 28, 1979

[30] Foreign Application Priority Data

Mar. 3, 1978 [GB] United Kingdom ............... 8562/78
Mar. 3, 1978 [GB] United Kingdom ............... 8563/78

[51] Int. Cl.³ .............................................. B64F 1/00
[52] U.S. Cl. .................................. 244/63; 244/114 R
[58] Field of Search ................... 244/63, 114 R, 116, 244/110 E

[56] References Cited

U.S. PATENT DOCUMENTS

| 2,292,374 | 8/1942 | Hagenbuch | 244/63 |
| 2,843,342 | 7/1958 | Ward | 244/63 |
| 2,923,504 | 2/1960 | Ortega et al. | 244/114 R |
| 4,173,323 | 11/1979 | Thorby et al. | 244/114 R |

FOREIGN PATENT DOCUMENTS 524736 9/1921 France ........................... 244/114 R Primary Examiner—Charles E. Frankfort
Attorney, Agent, or Firm—Cushman, Darby & Cushman

[57] ABSTRACT

A portable "Ski-Jump" runway for use by Hawker Siddeley Harrier Type V/STOL aircraft and other conventional tricycle undercarriage aircraft having suitable performance characteristics. The runway comprises a main central ramp constructed on or as the chassis of a truck or trailer along which in use the main undercarriage wheels travel and secondary ramp sections of substantially lighter structural construction collapsibly mounted on support frames cantilevered from the main ramp section along which in use the secondary undercarriage wheels of the aircraft travel. The main ramp section is conveniently divided into at least two, preferably three, lengths, the foremost length being part of the truck or trailer and with the rearward length or lengths capable of being stored on top of the foremost length for transportation purposes. Component parts of the secondary ramp sections may be stored in the truck for transportation purposes.

6 Claims, 2 Drawing Figures

PORTABLE RUNWAY

This invention relates to runways and more particularly to ramped runways of the type referred to as "Ski-Jump" runways for use by V/STOL aircraft such as for example the Hawker Siddeley Harrier. The principle of the Ski-Jump launch for Harrier type aircraft is described in Applicant's U.K. Pat. No. 1475313.

Trials of the Ski-Jump principle have shown that the anticipated advantages have been fully realised and Ski-Jump ramps are to be incorporated in ships for shipborne Harrier operations.

Although the Ski-Jump principle is associated with the V/STOL Hawker Siddeley Harrier which employs a tandum bicycle type main undercarriage with stabilising outrigger wheels at its wing tips, it is equally applicable to all forms of winged aircraft. Experience has shown that although the main undercarriage wheels of the Harrier aircraft leave the uppermost edge of the Ski-Jump at different points in time the longitudinal stability of the aircraft at launch is not unduly affected. Aircraft employing a tricycle type undercarriage however can present more serious difficulties when being launched from a conventional Ski-Jump ramped runway. Most conventional aircraft with a tricycle undercarriage carry between approximately ⅛ and ¼ of their weight on the nose wheel and if launched from a Ski-Jump the nosedown couple exerted on the aircraft when the nose wheel clears the edge of the runway and the main wheels are still on the runway could well be insufficient to adequately counter the nose-up rotation imparted by the runway geometry. The inertia of the aircraft puls the relatively ineffective aerodynamic controls at the low launch speeds could make this residual nose-up motion a serious problem.

Whilst the launch advantages of Ski-Jump are particularly attractive for shipborne application they are equally applicable to operational land use although whereas it is a relatively simple design exercise to incorporate the structural requirements of a Ski-Jump ramp in the construction of ship decks the equivalent land based ramp can present different problems.

It is an object of the present invention to provide a portable Ski-Jump whereby the particular launch advantages can be employed in a very flexible manner.

According to the present invention a Ski-Jump runway comprises a main ramp section or sections along which in use the main undercarriage wheels of an aircraft travel and secondary ramp sections or section of substantially lighter structural construction along which in use the secondary undercarriage wheel or wheels of the aircraft might travel. It is to be understood that reference to main undercarriage wheels is intended to refer to those undercarriage wheels jointly carrying in excess of say ¾ of the weight of the aircraft ie in the case of the Hawker Siddeley Harrier the tandum bicycle type central undercarriage and in the case of a tricycle undercarriage aircraft the main load carrying wheels usually located away from the centreline of the aircraft and in the region of the wings. Similarly reference to secondary undercarriage wheels is intended to refer to static support wheels other than those used in the main undercarriage ie in the case of the Hawker Siddeley Harrier the stabilising outrigger wheels and in the case of a tricycle undercarriage aircraft the nose wheel.

Preferably part at least of the or each main ramp section constitutes the chassis of a lorry or trailer. In this arrangement the main ramp section conveniently might be divided into at least two, preferably three, lengths, the foremost length being part of the lorry or trailer and with the rearward length or lengths capable of being stored on top of the foremost length for transportation purposes. The individual lengths of the main ramp section conveniently might be joined together by suitable hinge means.

The secondary ramp section or sections of the Ski-Jump runway might comprise a relatively lightweight structure located relative to the main ramp section or might, preferably, constitute light decking supported by outrigger frames cantilevered from the main ramp section. The cantilevered outrigger frames might be cross-braced with longitudinal beams; they might be detachably secured to the main ramp section or alternatively may be hinged thereto.

Additional support for the secondary ramp section might be provided if required by struts extending from the outrigger frames to the ground.

The foremost length of the main ramp section constituting the chassis of the lorry or trailer is provided with retractable jacking pads strategically placed to provide, when extended, an extremely stable base.

Movement of the retractable jacking pads and folding and spreading of the lengths of the main ramp section may be hydraulically powered from a pump or pumps in the prime mover associated with the lorry or trailer. Folding and spreading of the outrigger frames might also be effected hydraulically.

In a first embodiment of the invention in which the Ski-Jump runway is to be used with V/STOL aircraft employing a bicycle type main undercarriage as is used on the Harrier there is provided a single central main ramp section along which in use the main undercarriage wheels of the aircraft travel and outer secondary ramp sections of substantially lighter structural construction along which in use the stabilising outrigger wheels of the aircraft travel. In this arrangement the outrigger frames of the outer secondary ramp section are in use cantilevered from both sides of the central main ramp section. In this embodiment the central main ramp section is approximately 8 to 10 feet wide by approximately 100 feet long and the outer secondary ramp sections approximately 15 feet wide by 100 feet long. The height above ground of the foremost edge of the central main ramp section is 10 to 15 feet depending upon the ramp exit angle chosen.

In a second embodiment of the invention the Ski-Jump runway is arranged for use by aircraft employing a tricycle undercarriage, the runway comprising parallel main ramp sections along which in use the main undercarriage wheels of the aircraft travel and a central secondary ramp section of substantially lighter structural construction and of lesser gradient along which the nose wheel of the aircraft travels. The gradient of the ramp sections might be of linear or varying magnitude. Where the gradient is of varying magnitude the central secondary ramp section is of a larger radius of curvature than that of the parallel main ramp sections. The gradient of the parallel main and central secondary ramp sections might be common over an initial length thereof.

In this second embodiment the central secondary ramp section might comprise a series of strong slab-like members located between the parallel main ramp sections thereby linking them together. The sides of the parallel main ramp sections may be provided with means for receiving the slab members of the central secondary ramp section and securing them in position. Additional support framework means for the central secondary ramp section might be provided in a collapsible form convenient for storing with the slabs in the chassis of the lorry or trailer.

Also according to the invention a vehicle or trailer has its chassis in the general form of the foremost length of the central main ramp section of a Ski-Jump runway and has at least one rearward length of the central main ramp section hingedly attached to the foremost length and folded above the foremost length, and outrigger frames hingedly attached to the sides of the central main ramp section such that with the foremost and rearward length of the central main ramp section in an unfolded extended condition and the outrigger frames extended laterally therefrom and supporting suitable decking there is provided a Ski-Jump runway for use by V/STOL aircraft such as the Hawker Siddeley Harrier.

Figure 2:
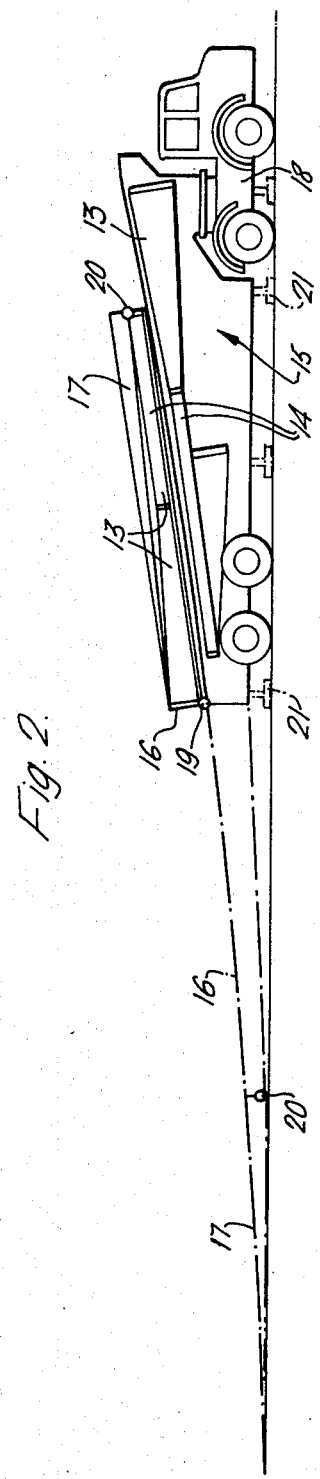

The main embodiment of the invention will now be described by way of example only with reference to the accompanying drawings in which:

FIG. 1 shows a fully erected Ski-Jump runway of the invention for use with Harrier type V/STOL aircraft, the decking panels being omitted from the right hand side for the purpose of clarity, FIG. 2 shows inside elevation the Ski-Jump runway of FIG. 1 in a fully stowed condition as the chassis of an articulated lorry.

Referring to FIGS. 1 and 2 the Ski-Jump runway constitutes a central main ramp section 10 and outer secondary ramp sections 11 formed from light decking panels 12 positioned on outrigger frames 13 cross-braced by longitudinal beams 14.

The central main ramp section 10 is built up of a foremost length 15 and rearward lengths 16 and 17. The foremost length 15 is the main chassis of an articulated lorry 18 and the three lengths 15, 16 and 17 are hinged together at 19 and 20 (FIG. 2) so that the lengths 16 and 17 might be folded back over and above the foremost length 15 as shown.

The outrigger frames 13 are hinged to the side walls of the central main ramp section 10 in such a manner that, together with the longitudinal beams 14 they might be folded alongside the central main ramp section 10 when in the stowed condition. Retractable jacking pads 21 are provided as shown on the main chassis and prime mover of the articulated lorry 18.

Operation of the portable Ski-Jump runway will now be described with reference initially to FIG. 2. The articulated lorry 18 with the stowed runway is driven to the chosen location. The retractable jacking pads 21 are lowered to provide a solid stable platform. The rearward length 16 and 17 of the central main ramp section 10 are then unfolded and extended to the position shown dotted in FIG. 1. The outrigger frames 13 and longitudinal beams 14 are then folded backwards or forwards as required to assume the positions as shown on the right hand side of FIG. 1. Decking panels 12 are then removed from their storage area inside the foremost length 15 and are assembled on the extended outrigger frames 13 and longitudinal beams 14. Additional support struts 22 might be provided at the three ends of the outrigger frames 13 if required. The prime mover of the articulated lorry 18 can remain attached to the ramp or may be driven away after erection.

The portable, folding Ski-Jump runway of this embodiment of the invention takes advantage from the fact that V/STOL aircraft of the Harrier type have a bicycle type main undercarriage which carries most of the loads imposed during launching. Experience has shown that repeated launches by many different pilots all follow a line within a few feet of the centre line of the runway. This makes it possible therefore to concentrate the strength and therefore most of the weight of the runway into a relatively narrow central strength member of approximately 8 to 10 foot width. The strength required of the central structure for launching the aircraft is such that it can also function as the load carrying chassis of the articulated lorry 18. The upper surface of the central main ramp section 10 is designed to produce a curved profile within very close tolerances and minimal flexure under load.

The outer secondary ramp sections 11 which support the aircraft's outrigger wheels are each approximately 15 feet wide, and the accuracy of profile of their surfaces is not critical and some flexure under load can be tolerated.

Finally it will be readily appreciated by those skilled in the art that there are many design variations embodying the broad principle of the invention of a portable Ski-Jump in which the main load-bearing section or sections of the runway comprise structurally strong sections the main part of which might constitute the chassis of a vehicle, whilst less heavily loaded sections might be assembled relative to the main sections using decking panels over a light framework.

I claim:

1. A portable Ski-Jump runway for use with V/STOL aircraft employing a bicycle type main carriage and secondary outrigger wheels comprising:

a vehicle having a chassis portion constituting a foremost length of ramp, said vehicle being selected from the group of vehicles comprising a truck and a trailer;

a rearmost length of ramp, said rearmost length of ramp being moveable between a first operative position in which said foremost length of ramp and said rearmost length of ramp are aligned to form a continuous central main Ski-Jump runway ramp section having side edges, and a second storage position in which said rearmost length of ramp is stored on top of said foremost length of ramp for transportation purposes;

outrigger frames adapted to be cantilevered from said side edges when said rearmost length of ramp is in its operative position; and decking adapted to be mounted on said outrigger frames to provide outer secondary Ski-Jump runway ramp sections, whereby in use the main undercarriage of the aircraft travels along said central main Ski-Jump runway ramp section and the secondary outrigger wheels travel along said outer secondary Ski-Jump runway ramp sections, said outer secondary Ski-Jump runway ramp sections having a substantially lighter weight than the weight of said central main Ski-Jump runway ramp section.

2. A Ski-Jump runway as claimed in claim 1 in which the rearmost length is formed of two separate lengths.

3. A Ski-Jump runway as claimed in claim 2 in which the individual lengths of the main Ski-Jump runway ramp section are hingedly joined together.

4. A Ski-Jump runway as claimed in claim 1 in which said outrigger frames are cross-braced with longitudinal beams.

5. A Ski-Jump runway as claimed in claim 1 further comprising additional support struts for supporting said secondary Ski-Jump runway ramp section by extending from said outrigger frames to the ground.

6. A Ski-Jump runway as claimed in claim 1 wherein said chassis of said vehicle includes retractable jacking pads strategically placed to provide, when extended, an extremely stable base.

* * * * *